I. M. POTTER & J. M. BUFFINTON.
TOOLS FOR THE MANUFACTURE OF STUDS, &c.
No. 181,009. Patented Aug. 15, 1876.
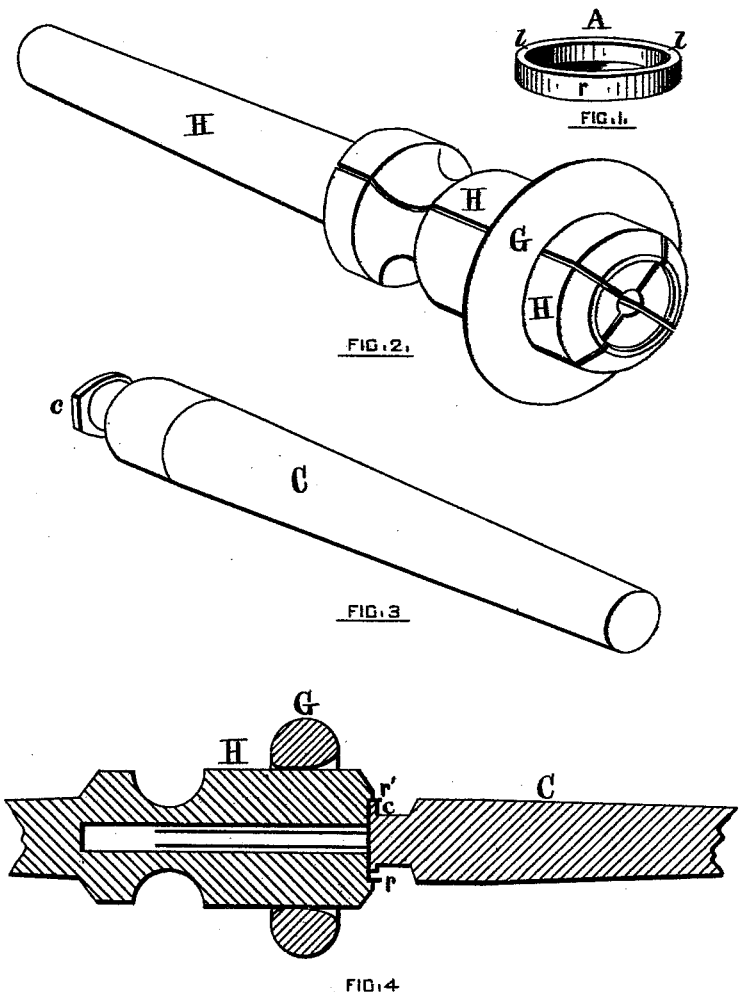

UNITED STATES PATENT OFFICE.

ISAAC M. POTTER AND JOHN M. BUFFINTON, OF PROVIDENCE, R. I.

IMPROVEMENT IN TOOLS FOR THE MANUFACTURE OF STUDS, &c.

Specification forming part of Letters Patent No. 181,009, dated August 15, 1876; application filed August 4, 1875.

*To all whom it may concern:*

Be it known that we, ISAAC M. POTTER and JOHN M. BUFFINTON, both of the city and county of Providence and State of Rhode Island, have invented certain new and Improved Tools for the Manufacture of Studs and Sleeve-Buttons, and similar articles of jewelry, which improvement is fully set forth in the following specification, reference being had to the accompanying drawings.

In the manufacture of many articles of jewelry—as, for example, studs and sleeve-buttons—the front portion consists of a flat piece of metal in a circular form with the outer edge bent down, so as to form a circular rim, this being done in a die, giving the metal or blank the form of an ordinary cover to a tin box.

It has been customary, heretofore, to solder upon the edge of this rim a flat ring formed by cutting out the center of another flat circular piece of metal. This additional piece serves to give a finish to the article and to strengthen the rim.

The object of our invention is to obviate the necessity of using the additional piece, and at the same time to produce the same result and effect; and consists in turning inward the lower portion of the rim by means of tools for that purpose.

In the accompanying drawings, Figure 1 represents the front part of a stud or sleeve-button after it has been submitted to our process, and shows the inward projection or lip made by turning or doubling inward the bottom portion of the rim. Fig. 2 is a lathe chuck or clutch, in which the blank is held for the purpose of submitting it to our process. Fig. 3 is a tool of our invention, having a cam-shaped projection on one end over which the fold or lip is made. This is placed in a lathe, and is called the cam-tool. Fig. 4 is a longitudinal central section of the chuck, the blank within the chuck and the cam-tool as they are brought together in the lathe. Fig. 5 is a section of the blank, showing the rim before the lip is formed. Fig. 6 is a section of a blank after the lip is formed.

A is the blank or front part of a stud or sleeve-button inverted, showing the rim *r*, with the bottom portion turned or doubled inward, forming the lip *l*.

H is an ordinary lathe-clutch in use by jewelers, having a circular recess in the end for receiving and holding the blank, and leaving a portion of the rim projecting, as shown in Fig. 4. The clutch is closed by slipping forward the ring G, the clutch at this point being tapering.

C is the cam-tool of our invention, with cam *c*, as shown in Fig. 3. The form of this cam is distinctly shown in Figs. 3 and 4, and the mode of application appears in the latter figure.

The clutch holding the blank being attached to the line center of the lathe the blank revolves around the cam *c*, the projecting portion of which fits the inner circle of the rim.

A burnishing-tool is now pressed against the portion of the rim extending beyond the clutch, as shown at *r'*, Fig. 4, doubling it over the edge of the cam as the blank revolves, thereby forming the lip *l*.

As the circumference of the cam has been cut away, leaving only a small arc of a circle to coincide with the inner surface of the rim, the cam is readily removed after the lip has been formed.

This forms an important feature of our invention.

This operation, by the means described, is performed with great rapidity, and this portion of a stud or button is obtained in a single piece, the labor of cutting out and soldering on an additional piece of metal being entirely obviated.

It will be observed that flat surfaces and right angles are as easily attainable as any other conformation, which is a feature much desired in many classes of work.

It is not claimed that this form has never been attained from a single piece of metal, but it has only been employed in the production of a comparatively high-priced article, and has never been introduced into general use on account of the cost.

By the use of our invention the work is performed at much less expense than by the soldering process hereinbefore described, and a better article is produced thereby.

We do not limit ourselves to the manufacture of studs and sleeve-buttons, which we have hereinbefore referred to as leading examples of the application of our invention, but we include as well all other subjects to which it is applicable.

What we claim as new, and desire to secure by Letters Patent, is—

The cam-tool $c$, in combination with the clutch H, substantially as shown and described, and for the purpose set forth.

ISAAC M. POTTER.
JOHN M. BUFFINTON.

Witnesses:
L. ASPINWALL,
L. O. ROCKWOOD.